Figure 1:
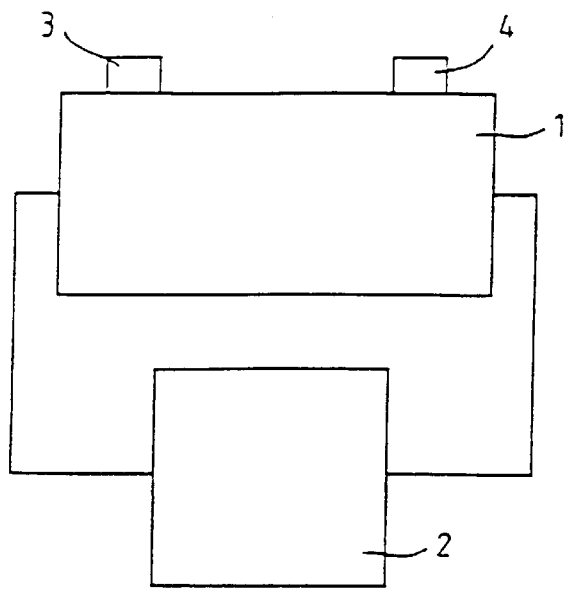

United States Patent [19]
Collier et al.

[11] Patent Number: 5,811,689
[45] Date of Patent: Sep. 22, 1998

[54] FLUID FLOW METER

[75] Inventors: **James Digby Yarlet Collier;
Christopher Davies**, both of
Cambridge; **Christopher James
Newton Fryer; Alain Henri Waha**,
both of Buckinghamshire, all of United
Kingdom

[73] Assignee: G. Kromschroder Aktiengellschaft,
Germany

[21] Appl. No.: 725,536

[22] Filed: Oct. 3, 1996

Related U.S. Application Data

[62] Division of Ser. No. 492,058, Aug. 28, 1995, Pat. No. 5,698,792.

[30] Foreign Application Priority Data

Jan. 30, 1993 [GB] United Kingdom .................... 9301873
Aug. 2, 1993 [GB] United Kingdom .................... 9316001

[51] Int. Cl.⁶ ..................................................... G01F 1/66
[52] U.S. Cl. ..................................... 73/861.28; 73/861.27
[58] Field of Search ............................. 73/861.27, 861.28, 73/861.29, 861.31, 118.2

[56] References Cited

U.S. PATENT DOCUMENTS

| | | | |
|---|---|---|---|
| 3,817,098 | 6/1974 | Brown | 73/194 A |
| 4,365,518 | 12/1982 | Zacharias | 73/861.31 |
| 4,365,541 | 12/1982 | Zacharias, Jr. | 73/861.28 |
| 4,475,406 | 10/1984 | Ansaldi et al. | 73/861.29 |
| 4,523,478 | 6/1985 | Zacharias | 73/861.28 |
| 5,168,762 | 12/1992 | Gill | 73/118.2 |
| 5,383,369 | 1/1995 | Khuri-Yakub et al. | 73/861.29 |

FOREIGN PATENT DOCUMENTS

| | | | |
|---|---|---|---|
| 249 689 | 3/1987 | European Pat. Off. | G01F 1/66 |
| 347 096 | 12/1989 | European Pat. Off. | G01P 5/00 |
| 2 209 216A | 4/1989 | United Kingdom | G01F 1/66 |
| 2 209 217A | 4/1989 | United Kingdom | G01F 1/66 |

*Primary Examiner*—Ronald L. Biegel
*Attorney, Agent, or Firm*—Townsend and Townsend and Crew LLP

[57] ABSTRACT

A fluid flow meter comprises a pair of transducers spaced apart in the direction of fluid flow. A transmitter causes acoustic signals to be transmitted in both directions through the fluid by the transducers. A processor determines information relating to the fluid flow by monitoring the time of flight of acoustic signals received by the transducers. Part of the space between the transducers defines a flow path consisting of a flow structure having a plurality of parallel fluid flow passages which extend axially in the direction of flow, wherein the cross-sectional diameters of the passages are chosen such that substantially plane acoustic waves only are transmitted through the passages by the fluid, and wherein under working conditions that fluid flows through each passage such that the ratio of the volume flow rate through the passage to the total volume flow rate remains substantially constant with respect to the total volume flow rate.

28 Claims, 5 Drawing Sheets

FLUID FLOW METER

This application is a division of application Ser. No. 08/492,058, now U.S. Pat. No. 5,698,792 filed Aug. 28, 1995, a 371 of PCT/GB94/00157 filed Jan. 27, 1994. This application also claims priority from GB applications Nos. 93 01873.7, filed Jan. 30, 1993, and 93 16001.8, filed Aug. 2, 1993.

This invention relates to a fluid flow meter of the kind comprising a first acoustic transducer upstream of a second acoustic transducer, the time of flight of acoustic waves between the transducers being used to measure the flow velocity of a fluid medium flowing between them.

An ultrasonic fluid movement device which uses this method is described in EP-A-0347096. This may be used to measure the flow velocity of gas through a passage of known dimensions. By multiplying the measured velocity by a velocity dependent co-efficient, the volume flow rate may be calculated. The device described may be used as part of a domestic gas meter.

A disadvantage with the prior art, eg. EP-A-0347096, is that the volume flow rate must be calculated by multiplying the measured velocity by a velocity dependent coefficient. The relationship between measured velocity and volume flow rate is non-linear, making this technique complex and imprecise in practise. It is therefore advantageous to be able to provide a more precise method of calculating the volume flow rate.

As described in "Theory of Transit Time Ultrasonic Flowmeters" (J. Hemp, Cranfield Institute of Technology, 27 Jul., 1981) under certain flow and acoustic conditions, the phase shift of a plane wave travelling down a tube due to the flow in the tube will be proportional to the volume flow rate alone. This is due to the integrating properties of a plane soundwave.

Compensation for off-axis modes is described in WO93/00570. In this method a ringaround transmission technique is used in which every fourth wave packet is inverted with respect to the preceding packets in order to annul the propagation effects of high order modes in the duct.

U.S. Pat. No. 4,365,518 discloses a sonic flow meter in which the flow path through the meter is divided into a number of elongate tubes which are sufficiently large with respect to the ultrasonic wavelength so that the ultrasonic pressure wave is propagated through each tube without substantial distortion. The prior art is unable to achieve a linear response over a significant range.

In GB-A-2209216, by providing passages with a diameter below a certain cut-off point, only plane waves will be transmitted along the flow path. The volume flow rate can then be directly calculated without the use of a velocity-dependent co-efficient. Highest accuracy is achieved when the signal measured follows the direct transmission path, without being modified by constructive or destructive echoes which would induce phase errors. Therefore mode suppression also improves accuracy by ensuring that the signals follow the direct path. However, the flow passages are arranged in a close-packed arrangement in the flow tube, so that different fluid flow paths are set up in passages at varying radial distance from the central axis of the flow tube. This can lead to errors in the measured flow rate.

According to a first aspect of the present invention, a fluid flow meter comprises a pair of transducers spaced apart in the direction of fluid flow; transmitting means for causing acoustic signals to be transmitted in both directions through the fluid by the transducers; and processing means for determining information relating to the fluid flow by monitoring the time of flight of acoustic signals received by the transducers, wherein part of the space between the transducers defines a flow path consisting of a flow structure having a plurality of parallel fluid flow passages which extend axially in the direction of flow, wherein the cross-sectional dimensions of the passages are chosen such that substantially plane acoustic waves only are transmitted through the passages by the fluid, and wherein under working conditions the fluid flows through each passage such that the ratio of the volume flow rate through the passage to the total volume flow rate remains substantially constant with respect to the total volume flow rate.

In this arrangement each passage samples a representative fraction of the total flow rate.

In contrast to the prior art, the present invention can achieve ±1% linearity over 3 decades.

The interstices between the passages are preferably blocked to prevent fluid flow therealong.

Preferably, each passage has a substantially circular cross-section.

The use of circular cross-section passages leads to a number of advantages over for example the hexagonal cross-sections used in GB-A-2209216. In particular, it enables an optimum compromise to be achieved between the need to minimise pressure drop along the flow path and to maximise phase shift.

Typically, the invention is achieved by arranging a symmetrical assembly, with transducers placed centrally at the ends of the flow path. The flow passages can be arranged with their centres at equal radial distances from a line connecting the centres of the transducers, and will therefore sample equivalent flow and acoustic fields, if the flow is isolated from external influences. Although not essential, this can be achieved by producing a rotary fluid flow in an inlet chamber, having substantially no component of velocity in the axial direction of the flow passages.

According to a second aspect of the present invention, we provide a fluid flow meter comprising a pair of transducers spaced apart in the direction of fluid flow; transmitting means for causing acoustic signals to be transmitted in both directions through the fluid by the transducers; and processing means for determining information relating to the fluid flow by monitoring the time of flight of acoustic signals received by the transducers, wherein part of the space between the transducers defines a flow path consisting of a flow structure having a substantially annular flow passage of constant outer diameter, the transducers also having a corresponding annular form.

In all these cases, it is desirable to prevent acoustic echoes off the flow structure. This could be achieved, for example, by positioning the transducers very close to the flow structure or by using absorbent material on the flow structure. Preferably, however, the flow structure presents respective angled, plane faces to incoming acoustic signals.

A fluid flow meter such as described above can be reduced to a small physical size (e.g. house brick size) and can be produced at low cost. A unit such as described is highly suitable for domestic gas metering.

Very low power consumption, which enables long term battery operation, is achieved through a high electroacoustic conversion efficiency and simple data processing.

The design is insensitive to gas composition when used as a gas meter, and can be implemented for different fluids, including liquids, for example water.

Figure 2:
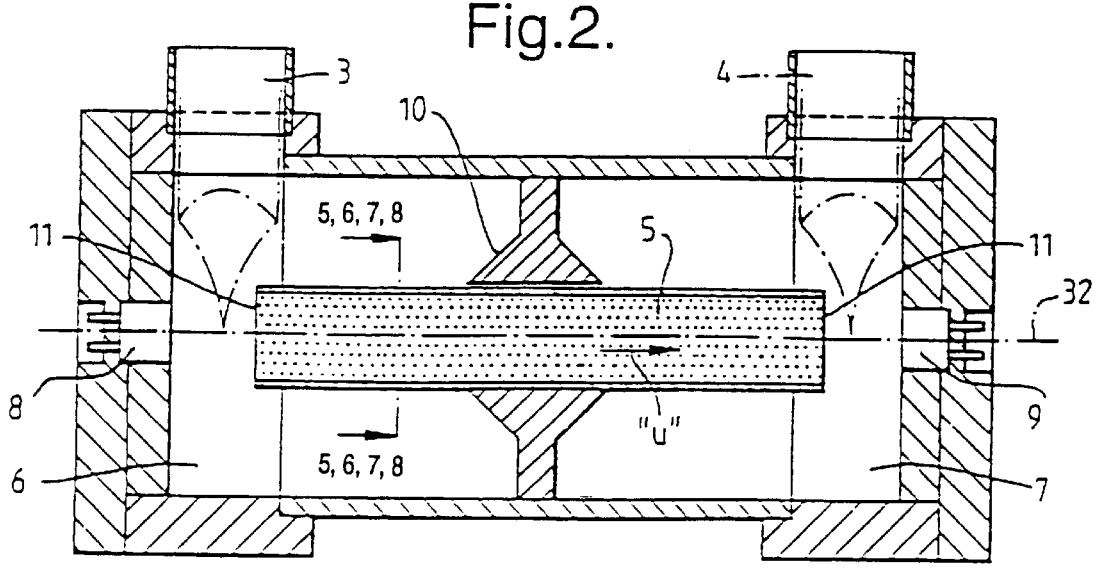
Figure 3:
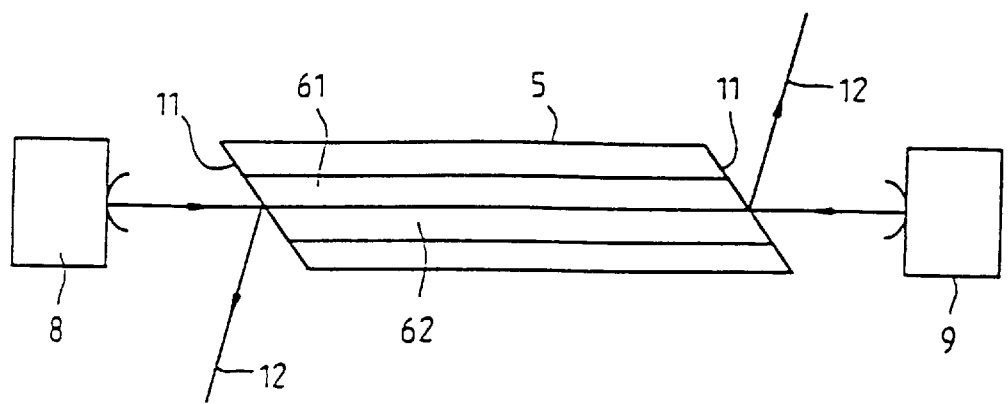
Figure 4:
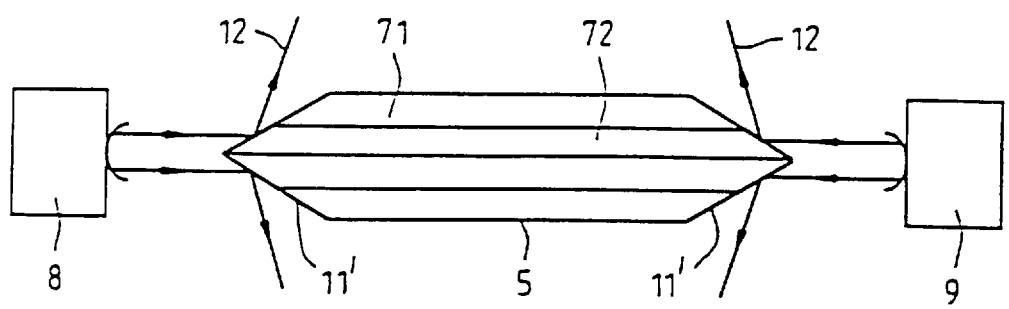
Figure 5:
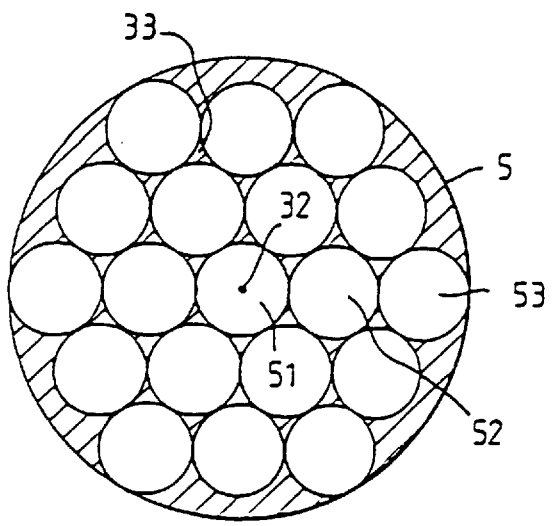
Figure 6:
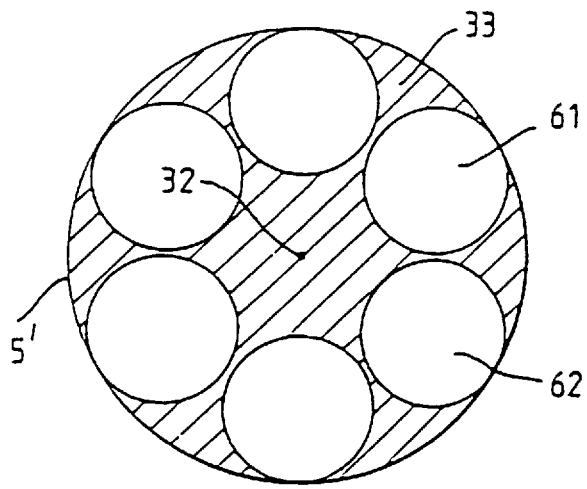
Figure 7:
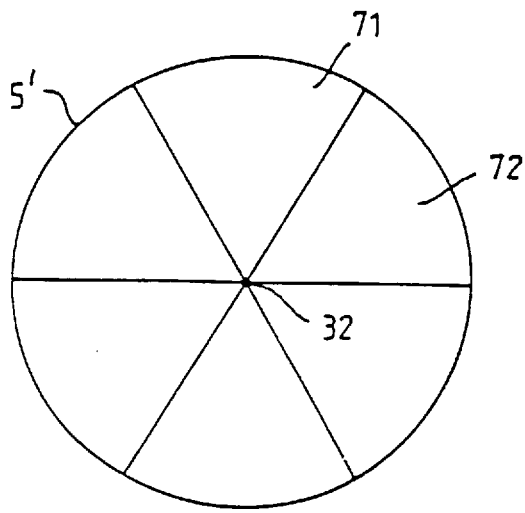
Figure 8:
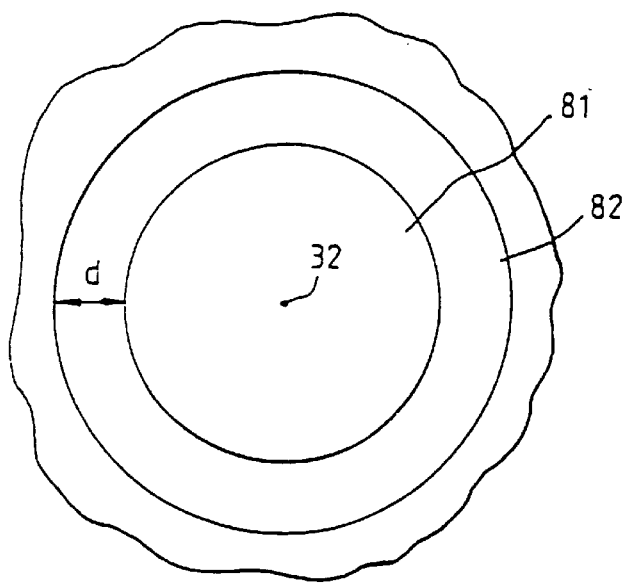
Figure 9:
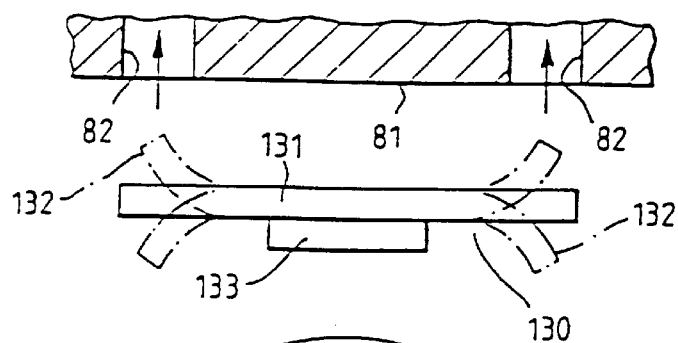
Figure 10:
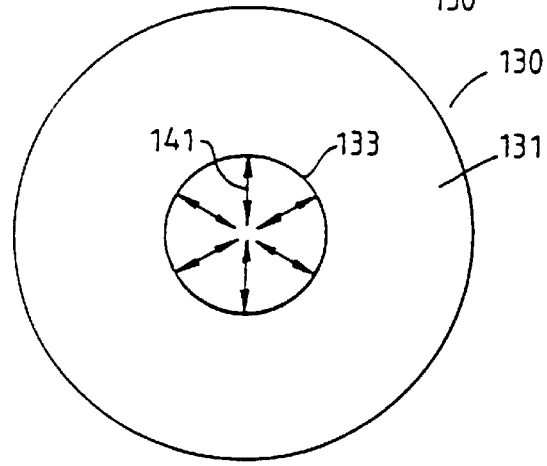
Figure 13:
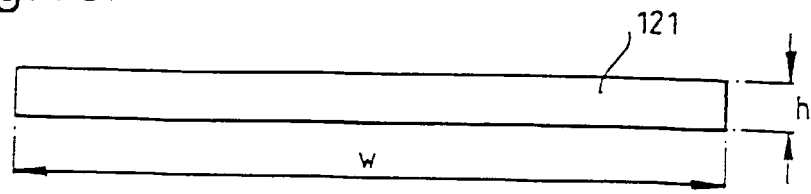
Figure 11:
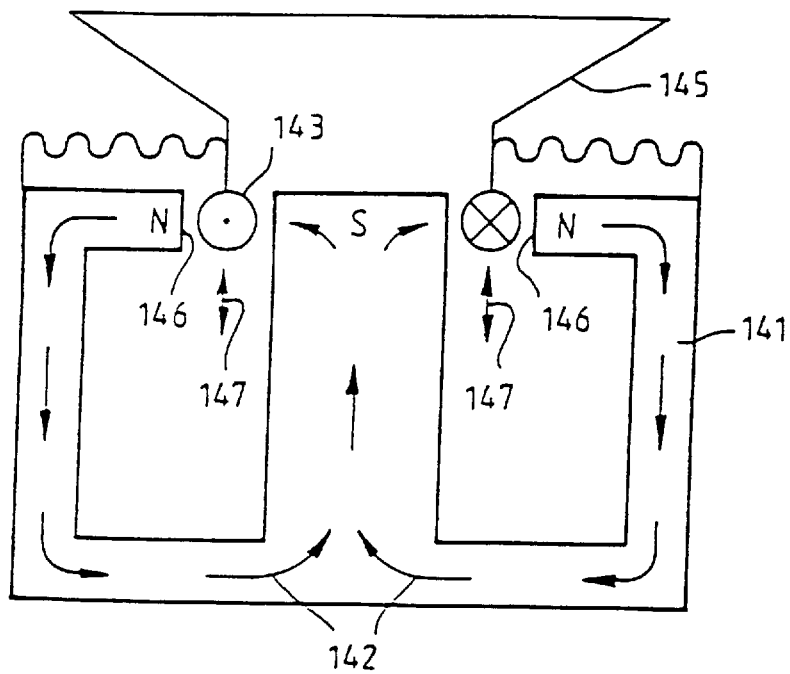
Figure 12:
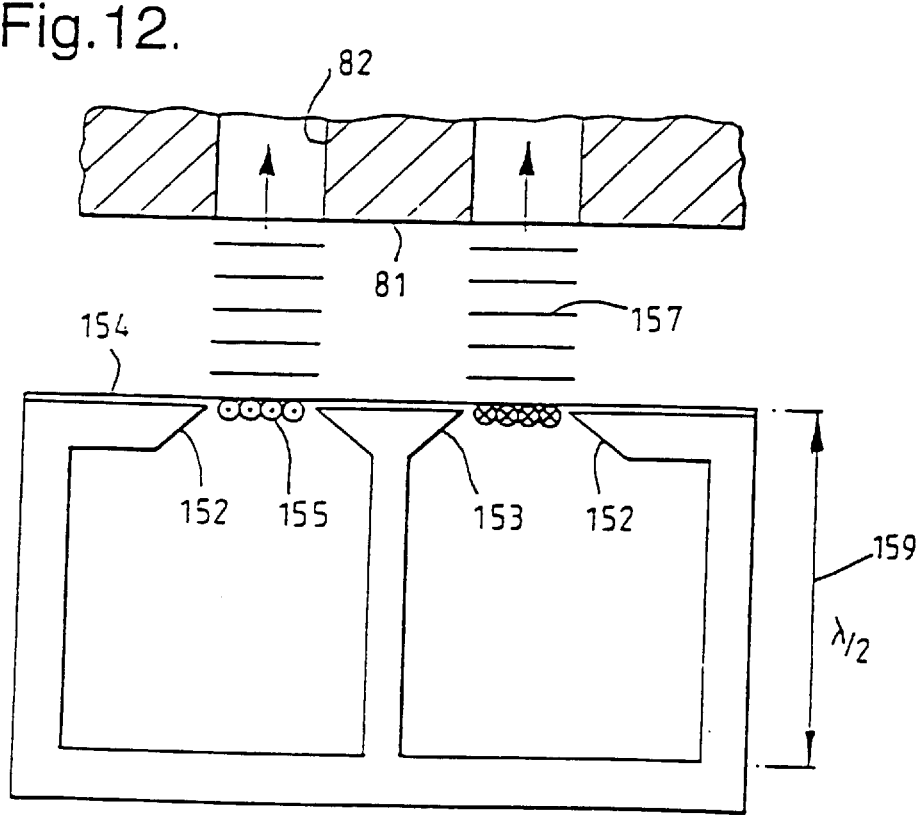

An example of a fluid flow meter in accordance with the present invention will now be described with reference to the accompanying drawings, in which:

FIG. 1 is a block diagram of the overall system;
FIG. 2 is a cross-section of the flow sensor apparatus;
FIG. 3 shows a tapered flow tube design;
FIG. 4 shows an alternative tapered flow tube design;
FIG. 5 is a cross-section through one example of the flow structure of FIG. 1 along a line A—A;
FIG. 6 is a cross-section similar to FIG. 5 but of a second example;
FIG. 7 is a cross-section similar to FIG. 5 but of a third example;
FIG. 8 is a cross-section similar to FIG. 5 but of a fourth example;
FIG. 9 shows a piezoelectric transducer transmitting acoustic waves into the passage of FIG. 8;
FIG. 10 is a plan view of FIG. 9, showing the radial oscillations of the piezoelectric element;
FIG. 11 illustrates a conventional loud speaker;
FIG. 12 is a second example of an annular transducer transmitting into an annular flow passage; and
FIG. 13 is a cross-section similar to FIG. 5 but of a fifth example.

The flow meter shown in FIGS. 1 and 2 consists of two parts: a flow sensor (1) and an electronic measurement system (2). The fluid enters the flow sensor at an inlet (3) and exits at an outlet (4) after having travelled down a metering tube (5) linking inlet and outlet chambers (6) and (7).

The flow is probed in the flow sensor using two ultrasonic transducers (8) and (9) to emit and receive pulses of sound down the metering tube. The elapsed time Δt from transmission to reception is timed in the upstream (+) and downstream (-) directions by the electronic system 2. From these measurements, the volume flow rate through the meter is determined as described above.

The electronics system 2 typically consists of a signal generator which drives the transducer (8) for an upstream measurement, switching to drive the transducer (9) for a downstream measurement. Acoustic signals propagate through the metering tube (5) and are received by the other transducer. Received signals are digitised and fed to a digital signal processing unit from which a flow rate signal is output.

Inlet chamber (6) is a cylindrical cavity into which fluid incoming through inlet (3) is injected tangentially in order to produce a rotary fluid flow within the chamber (6) having no component of velocity in the axial direction of the metering tube (5). The purpose of doing this is to remove or reduce flow influences upstream of inlet (3) which could affect flow velocity in metering tube (5). Metering tube (5) is thus effectively decoupled from external disturbing influences in the incoming flow, and the fluid flow through the tube is rotationally symmetrical about a line 32 connecting centres of the transducers.

An inner tube holder (10) can be shaped so as to reflect any signal away from the direct path so that echoes reflecting from it do not interfere with the direct path signal until the measurement has been made. This can be done by having angled faces with the small cross-section to scatter the signal and deflect it towards a longer interference path or an absorbing path.

Echoes are also experienced due to reflection of the acoustic signal from the ends (11) of the metering tube 5, back to the transducer (8 or 9). This may be avoided by designing the metering tube (5) as shown in FIGS. 3 or 4. The metering tube (5) comprises a number of flow passages (61,62) or (71,72). The metering tube ends (11,11') are tapered to reflect the signal 12 away from the transducer and away from the direct path, so that echoes reflecting from it do not interfere with the direct path signal during the measurement period.

The transducer directivity can be tailored to minimise the power of the signal that is not travelling down the metering tube.

The volume flow rate through the meter is derived from the measured velocity. If the velocity was uniform across the flow, the volume flow rate would simply be:

$$Q = U A$$

where Q is the volume flow rate, U the uniform flow velocity and A the cross-sectional area of the flow region.

However, due to the effect of viscosity, the velocity is not uniform, and in a circular pipe assumes a developing parabolic distribution from the inlet. This velocity profile is further modified by the onset of turbulence at the higher flow rates.

Under these conditions, the measured velocity cannot simply be multiplied by the cross-sectional area to arrive at a value for the volume flow rate. This needs to be corrected.

Unfortunately, the velocity profile assumed in the pipe is a function of many variables, and displays a non-linear behaviour. Standard averaging methods attempt to correct this shortcoming, but are expensive and imprecise in practice.

This meter uses the integrating properties of a plane sound wave. A plane wave travelling down a tube will experience a phase shift due to the flow in the tube. Under certain flow and acoustic conditions, this phase shift is proportional to the flow rate alone, as discussed in "Theory of Transit Time Ultrasonic Flowmeters" (J. Hemp, Cranfield Institute of Technology, 27 Jul., 1981, pp 142–144).

In order to guarantee that the time of flight Δt is measured by a plane sound wave only, we need to remove the higher order modes by time domain separation and/or by operating below the cut-off frequency of the metering tube.

In the present meter, the metering tube 5 is designed so as to transmit only plane waves at the frequency used to probe the flow. For every set of frequency, flow rate, pipe wall impedance and pipe geometry, there corresponds a cut-off frequency below which sound will only propagate in its first mode or as a plane wave.

At frequencies higher than the cut-off frequency, higher order modes propagate, the different modes travelling with different group velocities. This difference in velocities can also be used to isolate the plane wave transmission by differentiating in the time domain between the modes of propagation.

In a circular pipe, the dominant parameter upon the cut-off frequency is the pipe diameter. Hence, we can consider the problem in terms of a cut-off diameter. It is defined as the diameter below which the sound will only propagate as a plane sound wave at the given frequency.

The relationship between the cut-off pipe dimensions and the cut-off frequency is roughly linear and need not be known precisely. For a perfectly rigid circular pipe, this requirement translates into using a diameter smaller than 0.586 λ. Where λ is the wavelength of the signal propagating in free space. This requirement can be relaxed if viscous damping, wall flexibility and surface texture are considered. All these aspects act to limit or prevent higher mode propagation, thereby achieving plane wave only propagation in a pipe above this calculated cut-off frequency. For example, one can design a pipe lined with acoustic absorbent material, which effectively absorbs the higher order modes reflections and prevents their propagation.

The present meter has a metering tube (5) with an overall diameter much greater than the cut-off diameter for the chosen frequency of operation. However, it is subdivided into a number of parallel axially extending passages whose individual diameters are well below the cut-off diameter at 40 kHz. In cross-section, the metering tube (5) may be of close-packed structure, as illustrated in FIG. 5, which is a cross-section of the metering tube (5), showing a number of passages (51,52,53). The interstices 33 between the passages 51,52,53 are blocked.

This offers the advantage of keeping the flow velocities low, thereby reducing the flow resistance. It also reduces flow noise and improves the accuracy of the method.

In contrast to the close-packed structure, as shown in FIG. 5 a structure as shown in FIGS. 6 or 7 is preferred. The interstices 33 in FIG. 6 are blocked off and do not contain fluid. The structures shown in FIGS. 6 and 7 may be contrasted with the close-packed structure of FIG. 5 in the following way. The central axis line (32) connecting the transducers is shown in FIGS. 5 to 7, and is normal to the plane of the page. The passages (51,52,53) in FIG. 5 are each at different radial distances from the line 32. This causes different flow and acoustic paths to be sampled by each passage. In contrast, all the passages e.g. 61,62 in FIG. 6 and e.g. 71,72 in FIG. 7 are at equal radial distances from the line 32. The flow and acoustic paths in these passages are equivalent, and this causes a reduction in errors.

In all these examples the ratio $q_n/Q$ is constant for all working values of Q, where $q_n$ is the volume flow rate through the passage being probed, and Q is the total volume flow rate between the input and output chambers 6,7. A measurement of q then gives a value for Q.

An alternative flow passage is illustrated (in cross-section) in FIG. 8. An annular flow passage of constant outer diameter 82 contains fluid, and encloses a central solid portion 81 in the form of a massive rod. The portion 81 is supported by vanes (not shown) within the surrounding structure. The distance d is below the cut-off diameter, in order to suppress radial off-axis modes.

Circumferential off-axis modes are suppressed by ensuring equivalent transmitter/receiver response round the circumference. This can be achieved by suitable design of transducer.

Although not shown, various combinations of the FIG. 8 example with the examples of FIGS. 5 and 6 are possible.

An example of a suitable type of transducer is shown in FIG. 9, in which the annular flow passage 82 samples an annular region of the waves emitted by piezoelectric transducer 130. The transducer comprises a piezoelectric element 133 which is bonded to a metal disk 131, shown in cross-section in FIG. 9. As shown in the plan view of FIG. 10, the piezoelectric element 133 vibrates in a "radial" mode, indicated at 141, which causes the metal disk to vibrate as indicated by dotted lines 132 in FIG. 9.

A second example of a suitable transducer for use in conjunction with an annular flow passage is shown in FIG. 12. The transducer is similar in construction to a conventional permanent magnet moving coil loudspeaker shown in FIG. 11. Permanent magnet 141 carries flux lines as shown at 142. Coil 143, attached to cone diaphragm 145, vibrates in the magnetic field in the annular space 146 between the poles of the permanent magnet 141, in response to the electric current passing through it, as shown at 147.

In the transducer of FIG. 12 the pole pieces 152,153 are tapered to increase the magnetic field in the region between them. A light, non-conducting support diaphragm 154 carries a spiral coil of current conductors 155 on its surface. The spiral coil lies in the magnetic field between the pole pieces 152,153, and vibrates in response to a current through the coil. This provides an annular sound field 157, which may be input into the annular flow passage 82, and which does not vary around the circumference of the annulus, as required. It is preferable for the distance 159 to be approximately $\lambda/2$, where $\lambda$ is the wavelength of sound in the gas.

FIG. 13 illustrates, in cross-section, a further alternative flow passage, comprising a slot 121, dimensions h and w (where w is much greater than h). (As in FIGS. 8 and 10, fluid flows into the page). h is below the cut-off diameter, and off-axis modes in the w direction are suppressed by suitable design of transducer, as in the case of the annular passage.

In this example, the cross-sectional area "A" of the metering tube 5 is chosen so that the maximum mean flow velocity Umax, as defined by:

$$\overline{U}_{max} = \frac{Q_{max}}{A}$$

produces a sub-cyclic phase shift, i.e.:

$$\left[ \frac{l}{c - \overline{U}_{max}} - \frac{l}{c + \overline{U}_{max}} \right] f < 1$$

where f is the frequency of the acoustic waves, c is the speed of sound and l is the distance between the transducers.

This improves the linearity of the meter and facilitates the measure. It can be shown by analysis that reducing the phase shift $\Delta\theta$ due to the flow to $\Delta\theta < \pi$ ensures the independence of the measurement to flow velocity profile and increases the linearity of the flow meter. Keeping the phase shift sub-cyclic allows the same acquisition window to be used upstream and downstream, and thereby reduces the sensitivity to transducer response/start-up. However, perfectly acceptable performance has been achieved using an area A which does not produce a sub-cyclic phase shift.

We claim:

1. A fluid flow meter comprising:
   a flow structure defining a substantially annular flow passage extending along a direction of fluid flow;
   a pair of transducers spaced apart along the direction of fluid flow, said transducers also having an annular form corresponding to the annular flow passage;
   transmitting means for causing acoustic signals to be transmitted in both directions through the fluid by said transducers; and
   processing means for determining information relating to the fluid flow by monitoring the time of flight of acoustic signals received by said transducers.

2. A fluid flow meter according to claim 1, wherein said flow structure presents respective, angled plane faces to incoming acoustic signals.

3. A fluid flow meter according to claim 1, wherein said flow structure includes a central solid portion defining an inner wall of said annular flow passage.

4. A fluid flow meter according to claim 3, wherein said central solid portion is supported by vanes within a surrounding structure.

5. A fluid flow meter according to claim 1, wherein said transducers comprise piezoelectric elements which vibrate in a radial mode.

6. A fluid flow meter according to claim 1, wherein each transducer comprises:
   means for generating a magnetic field within an annular space; and
   a coil positioned within said annular space whereby or passage of an electric current through said coil, said coil vibrates to generate the acoustic signals.

7. A fluid flow meter according to claim 6, wherein said magnetic field generating means comprises a generally "E" shaped member, the depth of the arms of the member being approximately $\lambda/2$ where $\lambda$ is the wavelength of the acoustic signals transmitted through the fluid.

8. A fluid flow meter comprising:
   a flow structure defining a substantially annular flow passage with a constant outer diameter, said flow passage extending along a direction of fluid flow said flow structure having a portion defining an inner wall of said annular flow passage, which portion guides said fluid flow through said annular flow passage;
   a pair of transducers spaced apart along the direction of fluid flow;
   transmitting means for causing acoustic signals to be transmitted in both directions through the fluid by said transducers; and
   processing means for determining information relating to the fluid flow by monitoring the time of flight of acoustic signals received by said transducers, wherein said annular flow passage has a radial dimension such as to permit propagation of substantially only plane wave acoustic signals.

9. A fluid flow meter according to claim 8, wherein the flow structure presents respective, angled plane faces to incoming acoustic signals.

10. A fluid flow meter according to claim 8, wherein said portion is a central solid portion defining said inner wall of said annular flow passage.

11. A fluid flow meter according to claim 10, wherein said central solid portion is supported by vanes within a surrounding structure.

12. A fluid flow meter according to claim 8, wherein said annular flow passage is positioned so as to sample an annular region of waves emitted by said transducers.

13. A fluid flow meter according to claim 8, wherein said transducers have an annular form corresponding to said flow passage.

14. A fluid flow meter according to claim 8, wherein said transducers comprise piezoelectric elements which vibrate in a radial mode.

15. A fluid flow meter according to claim 14, wherein each piezoelectric element is bonded to a respective metal disc.

16. A fluid flow meter according to claim 8, wherein said transducers are constructed so as to generate an annular sound field which is input into said annular flow passage.

17. A fluid flow meter according to claim 8, wherein each transducer comprises:
   means for generating a magnetic field within an annular space; and
   a coil positioned within said annular space whereby on passage of an electric current through said coil, said coil vibrates to generate the acoustic signals.

18. A fluid flow meter according to claim 17, wherein said magnetic field generating means comprises tapered pole pieces.

19. A fluid flow meter according to claim 17, further comprising a non-conducting support diaphragm which carries said electrical coil.

20. A fluid flow meter according to claim 17, wherein said magnetic field generating means comprises a generally "E" shaped member, the depth of the arms of the member being approximately $\lambda/2$ where $\lambda$ is the wavelength of the acoustic signals transmitted through the fluid.

21. A gas flow meter comprising:
   a flow structure defining a substantially annular flow passage with a constant outer diameter, said flow passage extending along a direction of fluid flow said flow structure having a portion defining an inner wall of said annular flow passage, which portion guides said fluid flow through said annular flow passage;
   a pair of transducers spaced apart along the direction of fluid flow;
   transmitting means for causing acoustic signals to be transmitted in both directions through the fluid by said transducers; and
   processing means for determining information relating to the fluid flow by monitoring the time of flight of acoustic signals received by said transducers, wherein said annular flow passage has a radial dimension such as to permit propagation of substantially only plane wave acoustic signals.

22. A gas flow meter according to claim 21, wherein the flow structure presents respective, angled plane faces to incoming acoustic signals.

23. A gas flow meter according to claim 21, wherein said portion is a central solid portion defining said inner wall of said annular flow passage.

24. A gas flow meter according to claim 21, wherein said annular flow passage is positioned so as to sample an annular region of waves emitted by said transducers.

25. A gas flow meter according to claim 21, wherein said transducers have an annular form corresponding to said flow passage.

26. A gas flow meter according to claim 21, wherein said transducers comprise piezoelectric elements which vibrate in a radial mode.

27. A gas flow meter according to claim 21, wherein each transducer comprises:
   means for generating a magnetic field within an annular space; and
   a coil positioned within said annular space whereby on passage of an electric current through said coil, said coil vibrates to generate the acoustic signals.

28. A gas flow meter according to claim 27, wherein said magnetic field generating means comprises a generally "E" shaped member, the depth of the arms of the member being approximately $\lambda/2$ where $\lambda$ is the wavelength of the acoustic signals transmitted through the fluid.

* * * * *

UNITED STATES PATENT AND TRADEMARK OFFICE
CERTIFICATE OF CORRECTION

PATENT NO. : 5,811,689
DATED : September 22, 1998
INVENTOR(S) : JAMES DIGBY YARLET COLLIER et al.

It is certified that error appears in the above-identified patent and that said Letters Patent is hereby corrected as shown below:

On the title page,
[62] After: "Division of Ser. No. 492,058, Aug. 28, 1995, Patent No.," please delete "5,698,792" and insert --5,777,237--.

Signed and Sealed this

Twentieth Day of July, 1999

Attest:

Q. TODD DICKINSON

Attesting Officer

Acting Commissioner of Patents and Trademarks